US00RE48121E

(19) United States
(12) Reissued Patent
Dvoskin

(10) Patent Number: US RE48,121 E
(45) Date of Reissued Patent: Jul. 28, 2020

(54) COMPLIANCE DEVICE, SYSTEM AND METHOD FOR MACHINE OPERATION

(71) Applicant: Daniel Dvoskin, West Hartford, CT (US)

(72) Inventor: Daniel Dvoskin, West Hartford, CT (US)

(21) Appl. No.: 15/902,100

(22) Filed: Feb. 22, 2018

Related U.S. Patent Documents

Reissue of:
(64) Patent No.: 9,272,713
Issued: Mar. 1, 2016
Appl. No.: 14/314,017
Filed: Jun. 24, 2014

U.S. Applications:
(60) Provisional application No. 61/838,864, filed on Jun. 24, 2013.

(51) Int. Cl.

| | |
|---|---|
| ***G06F 17/00*** | (2019.01) |
| ***B60W 40/08*** | (2012.01) |
| ***G05B 9/02*** | (2006.01) |
| ***B60K 28/00*** | (2006.01) |
| ***B60K 28/02*** | (2006.01) |
| *B60R 21/015* | (2006.01) |
| *B60W 50/08* | (2020.01) |

(52) U.S. Cl.
CPC ..... *B60W 40/08* (2013.01); *B60K 28/00* (2013.01); *B60K 28/02* (2013.01); *G05B 9/02* (2013.01); *B60K 2028/003* (2013.01); *B60R 21/015* (2013.01); *B60W 50/08* (2013.01); *B60W 2040/0818* (2013.01); *G06F 17/00* (2013.01)

(58) Field of Classification Search
CPC ... H04W 12/06; B60R 25/24; B60R 2325/205
See application file for complete search history.

(56) References Cited

U.S. PATENT DOCUMENTS

| | | | | |
|---|---|---|---|---|
| 6,113,137 | A * | 9/2000 | Mizutani | G01S 7/4802 280/734 |
| 6,853,956 | B2 | 2/2005 | Ballard et al. | |
| 7,451,852 | B2 | 11/2008 | Stewart et al. | B60K 28/063 180/272 |
| 8,290,480 | B2 * | 10/2012 | Abramson et al. | 455/418 |
| 8,432,269 | B2 * | 4/2013 | Christensen et al. | 455/418 |
| 8,479,864 | B2 * | 7/2013 | White et al. | 180/272 |
| 8,744,678 | B2 * | 6/2014 | Becher et al. | G06F 17/00 701/29.7 |
| 8,948,993 | B2 * | 2/2015 | Schulman | 701/36 |
| 8,965,394 | B2 * | 2/2015 | Rogitz | 455/456.1 |

(Continued)

*Primary Examiner* — Jeffrey R Jastrzab
(74) *Attorney, Agent, or Firm* — Murtha Cullina LLP; Anthony P. Gangemi

(57) ABSTRACT

A device, system and method for establishing, determining compliance and ongoing monitoring of a user in the operation of a machine based on predetermined restrictions. The system is useful for a motor vehicle and, more particularly, to comply with user restrictions in teen driving, the presence of passengers, time of day, curfew, range and location, speed, sobriety and the like, An ignition interlock is engaged if one or more sensors that monitor the presence of the vehicle operator, passengers inside the vehicle compartment, and other operational compliance parameters established for the vehicle is out of compliance, and disengaged if compliance is verified.

21 Claims, 7 Drawing Sheets

(56) References Cited

U.S. PATENT DOCUMENTS

| | | | | |
|---|---|---|---|---|
| 2004/0004539 | A1* | 1/2004 | Collins | 340/425.5 |
| 2005/0288844 | A1* | 12/2005 | Kimura | B60K 26/021 701/100 |
| 2006/0208169 | A1* | 9/2006 | Breed | B60N 2/002 250/221 |
| 2007/0126561 | A1* | 6/2007 | Breed | B60K 28/066 340/426.13 |
| 2007/0158128 | A1* | 7/2007 | Gratz et al. | 180/287 |
| 2007/0239992 | A1* | 10/2007 | White | B60K 28/063 713/186 |
| 2008/0245598 | A1* | 10/2008 | Gratz et al. | 180/287 |
| 2009/0082951 | A1* | 3/2009 | Graessley | 701/200 |
| 2011/0128118 | A1* | 6/2011 | Gilleland | B60R 25/24 340/5.2 |
| 2012/0050010 | A1* | 3/2012 | Largue | 340/5.72 |
| 2012/0214408 | A1 | 8/2012 | Chronster | H04W 12/06 455/26.1 |
| 2013/0282238 | A1* | 10/2013 | Ricci | G06F 3/0484 701/41 |
| 2013/0344859 | A1* | 12/2013 | Abramson | G06Q 50/265 455/418 |
| 2014/0214279 | A1* | 7/2014 | Bunton | 701/45 |
| 2016/0021238 | A1* | 1/2016 | Abramson | H04W 48/04 455/418 |

* cited by examiner

COMPLIANCE DEVICE, SYSTEM AND METHOD FOR MACHINE OPERATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

The present application claims priority to Provisional Application Ser. No. 61/838,864, filed Jun. 24, 2013, entitled "Presence Of Passenger-Time-Cell Phone Presence—Ignition Interlock Device" which is incorporated herein by reference in their entirety.

FIELD OF THE INVENTION

This invention relates to a compliance device for a motor vehicle and, more particularly, to a presence of passenger and time ignition interlock device (PITD) and monitoring system having one or more sensors that monitor the presence of the vehicle operator, passengers inside the vehicle compartment, and other operational compliance parameters established for the vehicle.

BACKGROUND OF THE INVENTION

While vehicle ignition lock systems have existed in the prior art, typically they are wired devices that are difficult, time-consuming, and costly to install and operate. Conventional sobriety interlock systems have been specifically developed for the restricting a driver's ability to start the vehicle or for their driving privilege, e.g. a driving restriction for sobriety or restriction for no mobile phone use during operation.

Ignition interlock devices are known to insure sobriety of the operator of a machine. For example, U.S. Pat. No. 6,853,956 issued Jun. 4, 2013, to Ballard, for Sobriety testing apparatus having OBD-II connection capability, describes a sobriety interlock system having an alcohol detection device, a computing device electrically connected to the alcohol detection device capable of determining a blood alcohol concentration of an operator based, and an electronic circuit for obtaining machine operating parameters is disposed between an on-board diagnostic port on the machine and the computing device. U.S. Pat. No. 7,451,852 issued Nov. 18, 2008 to Stewart, et al. for Vehicle Sobriety Interlock System With Personal Identification Element, describes an interlock system for measuring the sobriety of a potential motorized apparatus operator is coupled to the starting mechanism of said motorized apparatus that includes a microprocessor controlled handset, base unit and photographic device that facilitates the identification process of the person taking the test by taking at least two consecutive pictures, one before and one during the test. Both of these devices are sobriety interlock systems having an alcohol detection device electronically connected to a computing device that let a machine start only if the BAC (blood alcohol content) of the operator is less than programmed on the computing device. Although these devices have interlock systems to prevent dangerous and illegal operation of machinery they do not prevent an operator from carrying unlawful passengers, not *wearing* seat belts, busting curfew, and other operating restrictions that are predetermined for certain persons.

There are also a few devices that restrict cell phone usage. A U.S. Pat. No 20120214408 to Chronister, describes an ignition lock that prevents cell phone use by the user of equipment that includes a cellular device dock with integrated lock connected to an ignition of the equipment configured to prevent use of a cellular device by the user of equipment unless the cellular device is inserted into the cellular device dock. If no cellular device is inserted and/or if the cellular device is not identified by using a matching RFID chip and a RFID reader, the equipment will not start, due to an incomplete starter circuit. The cellular device dock with integrated lock describes a way to ensure that vehicle operators do not hold cell phones while driving.

While ignition interlock systems have been used for sobriety and cell phone, none have been developed to insure parental and legal control of the number of passengers a restricted driver can carry, and at what hours the operator can operate the machine. For example, conventional vehicle ignition lock systems may not monitor compliance with driving licensure restrictions and other State Graduated Driver Licensing (GDL) Laws that restrict a driver's privilege in the operation of the vehicle. Restricting a driver's privilege in the operation of the vehicle heretofore has been personally monitored by a supervisor, such as a boss, parent, court, or agent. Moreover, other driving licensure restrictions can include time of day, passengers, use of corrective lenses and the like. For example, time of day restriction from the State licensing authority may relate to eyesight where a driver with eye disease, congenital malformations and/or deformations of eyes eyesight may have a statutory driving restriction placed on the license, e.g. for a medical condition such as glaucoma, myopia, partial blindness or the elderly. For example, if a driver has an eyesight licensure restriction, known conventional ignition lock and monitoring systems would not function to monitor compliance of the restriction by the operator of the vehicle. As a result, vehicle ignition lock systems for drunk driving do not function to measure compliance with driving licensure restrictions and/or State GDL Laws.

Other licensure restrictions may apply to the licensure of new driver, Learner's Permit, teen drivers below the age of 18, public transportation, transportation of children in a School Bus, and the like. For example, new drivers under the age of 18 years old in the State of Connecticut have licensure restriction as follows: With your restricted driver's license, you must adhere to the following driving restrictions: For the first 6 months:

- You may only drive with your parent/guardian, driving instructor, or qualified driving trainer who is at least 20 years old with 4 years driving experience.

For the second 6 months:

- You may only drive with the people mentioned above, as well as immediate members of your family.

Until you are at least 18 years old:

- You may not drive from 11 p.m. to 5 a.m., unless traveling to or from school, work, church, or because of an emergency.
- All passengers in your vehicle must wear a seatbelt at all times.
- You may not operate a cell phone or hand-held device at any point while behind the wheel.
- You may not drive any public service or vanpool vehicle.

As a result, the sobriety ignition lock and monitoring systems do not function to measure compliance with driving licensure restrictions and/or State GDL Laws such as licensure restrictions on the operation of the vehicle for work, time of day, and in the carrying of passengers.

Therefore, a need exists for a monitoring system that provides compliance in the operation of the vehicle, with operator permission and operational parameters in the vehicle operator's system, and monitor the presence of the vehicle operator and passengers inside the vehicle.

SUMMARY OF THE INVENTION

It is an object of the present invention to provide a system for monitoring the compliance of a user of a machine. The system has a system controller operably connected to the machine, one or more input devices integrated with the system controller and configured to provide inputs to the system to configure one or more predetermined restrictions for the user in a storage of the system in order to operate the machine and measure the user's compliance with the predetermined restrictions. a display device integrated in the system controller and configured to display input, status and operation of the system, at least one sensor configured to communicate sensor information to the system controller concerning compliance with the predetermined restrictions, an energy source or battery configured to provide power to at least the system controller; and an output signal configured to restrict operation of the machine when the sensor information is not in compliance with the predetermined restrictions. The sensors can be presence infrared sensors to detect the presence of front and rear passengers in the machine.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Description of the Embodiments, which is to be read in association with the accompanying drawings, which are incorporated in and constitute a part of this specification, show certain aspects of the subject matter disclosed herein and, together with the description, help explain some of the principles associated with the disclosed implementations, wherein.

DESCRIPTION OF THE EMBODIMENTS

Figure 1:
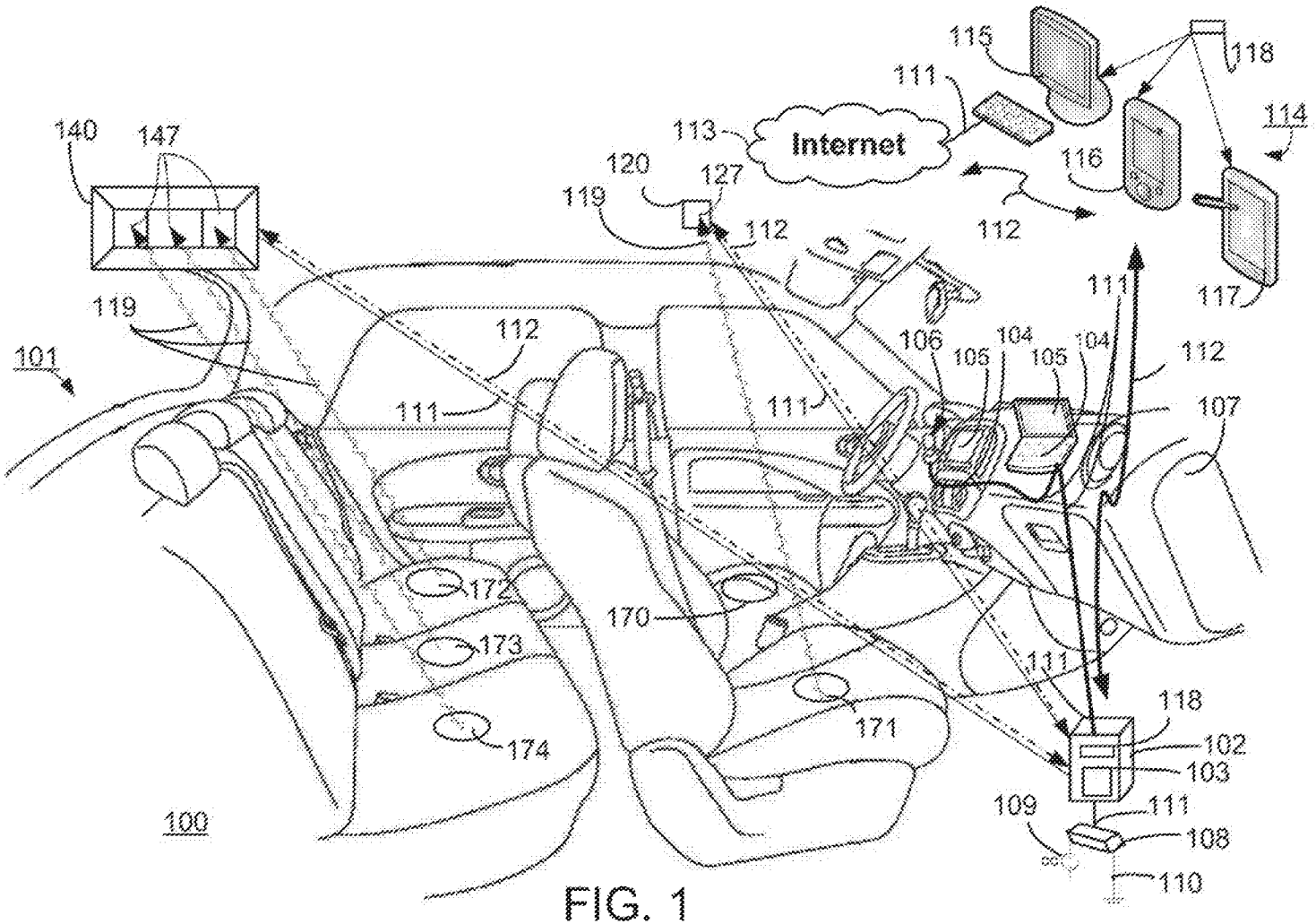
FIG. 1 illustrates a schematic view of the apparatus, system, and method in accordance with an embodiment of the present invention.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "Presence of Passenger and Time Ignition Interlock Device (PTID)" refers to the restriction and compliance monitoring device, system and method 100 of the present application claims and incorporating the disclosure of Provisional Application Ser. No. 61/838,864, filed Jun. 24, 2013.

As used herein the term "cell phone" refers to any electronic communication device that has the ability to call, send a text message or any other form of communication that may be a distraction while operating a motor vehicle. The word cell phone further includes devices not limited to: cell phones, smart phones, tablets and music players with Internet capabilities.

As used herein the term "passive infrared" or "PIR" or passive infrared sensor" or "PIR sensor" refers to an electronic sensor that measures infrared (IR) light radiating from objects in its field of view.

Referring to FIGS. 1-22, a restriction and compliance monitoring device, system and method, generally shown as 100, is described according to an embodiment of the present invention. The compliance system 100 is useful to show compliance with restriction(s) placed on the operation of machine 101 such as, for example, an automobile. It is to be appreciated that the compliance device, system and method 100 of the present invention is not limited to only automobiles as a wide variety of machines are contemplated to benefit from the present invention including vehicles such as tractors, trucks and the like.

As is illustrated in FIG. 1, the restriction and compliance monitoring device, system and method 100 includes a machine 101 that is configured with a receiver 102, computing device 103, with a keypad 104 and display 105, i.e. liquid crystal display (LCD) for supplying and viewing inputs to the receiver 102 and computing device 103 so as to configure and operate the compliance monitoring system 100 regarding the operation of the machine 101 by a user 170, and the presence of a front passenger 171 and one or more passenger(s) in the rear seat 172, 173, and 174. The receiver 102 and computing device 103 are operably connected via lines 111 to the ignition 107 or other switch that controls the ability to start/stop and turn on/off the machine 101. The receiver 102 and computing device 103 can be installed in the machine 101 at remote location such as under the dashboard 107, in the trunk or other predetermined location. The receiver 102 and computing device 103 can be located near the fuse or bus panel 108 that supplies a source of power 109, i.e. Direct Current (DC) and ground 110 so as to form an electrical circuit. The receiver 102 and computing device 103 can have wireless capabilities such as, for example, Wi-Fi, blue tooth and other wireless connectivity.

The restriction and compliance monitoring device, system and method 100 further has one or more sensors that provide restriction-based information for compliance and monitoring such as, for example, a front passenger sensor assembly 120, and a rear passenger sensor assembly 140. The front passenger sensor assembly 120 can be configured to sense the presence of a passenger in the front seat 171 and to communicate with the receiver 102 and the computing device 103 via a direct line 111, which lines 111 can be installed, for example, above in the headliner of the vehicle, or sense the presence of a passenger 171 in the front seat and to communicate with the receiver 102 via a wireless 112 connection. The front passenger sensor assembly 120 can be mounted in a location adjacent the passenger seat of the machine 101 such as, for example, above the passenger 171 The front passenger sensor assembly 120, according to an embodiment of the present invention, can be configured with a presence infra-red PIR electronic sensor 127, 147 that measures infrared (IR) light or heat trace 119 radiating from objects in its field of view. The front passenger sensor assembly 120 also can include a light sensor 160 for providing information about tampering, fail-safe and time of day, e.g. day and night information.

The restriction and compliance monitoring device, system and method 100 can be implemented on the computing device 103 by one or more steps in software 108 so as to control the receiver 102 and computing device 103 using a stand-alone keypad 104 and display 105, an existing a keypad 104 and display 105 of the machine 101 (also shown in the center console of the vehicle in FIG. 1). Additionally, the software 108 can be configured so that a remote computer 115, cellular telephone or smart phone 116, tablet 117 and the like can connect to the computing device 103 via a wireless connection 112 to the receiver 102 such as blue tooth or over the Internet 113 to configure, operate and monitor the restriction and compliance monitoring system 100. Similarly, the rear passenger sensor assembly 140 can be configured to sense the presence of one or more passenger(s) 172, 173, and 174 in the rear seat so as to communicate with the receiver 102 and the computing device 103 via a direct line 111, which lines 111 can be installed, for example, above in the headliner of the vehicle to or, alternatively, via a wireless 112 connection to communicate with the receiver 102 the presence of a passenger (s) 172, 173 and/or 174 in the rear seat. The rear passenger sensor assembly 140 can be mounted in a location adjacent the passenger(s) 172, 173 and/or 174 seat of the machine 101 such as, for example, above the rear seat in the vehicle headliner. The rear passenger sensor assembly 140 can include a fail-safe switch formed from an opening 155 and a button 156 such as, for example, when the fail-safe switch is normally "closed" and if the rear passenger sensor assembly 140 is removed from its mounting the button disengages to an "open position" causing the switch to break whereby the rear passenger sensor assembly 140 indicates tampering of the sensing module 101. The rear passenger sensor assembly 140, according to an embodiment of the present invention, can be configured with a PIR electronic sensor 150 that measures infrared (IR) light or heat trace 119 radiating from radiating from passenger(s) 172, 173 and/or 174 in each PIR electronic sensor 150 in the respective field of view. The rear passenger sensor assembly 140 also can include one or more light sensor(s) 160 for each PIR sensor 150, whereby each light sensor 160 provides fail-safe information about tampering (i.e. if the sensing module is purposely covered) and time of day, e.g. day and night information for licensure restrictions.

Figure 2:
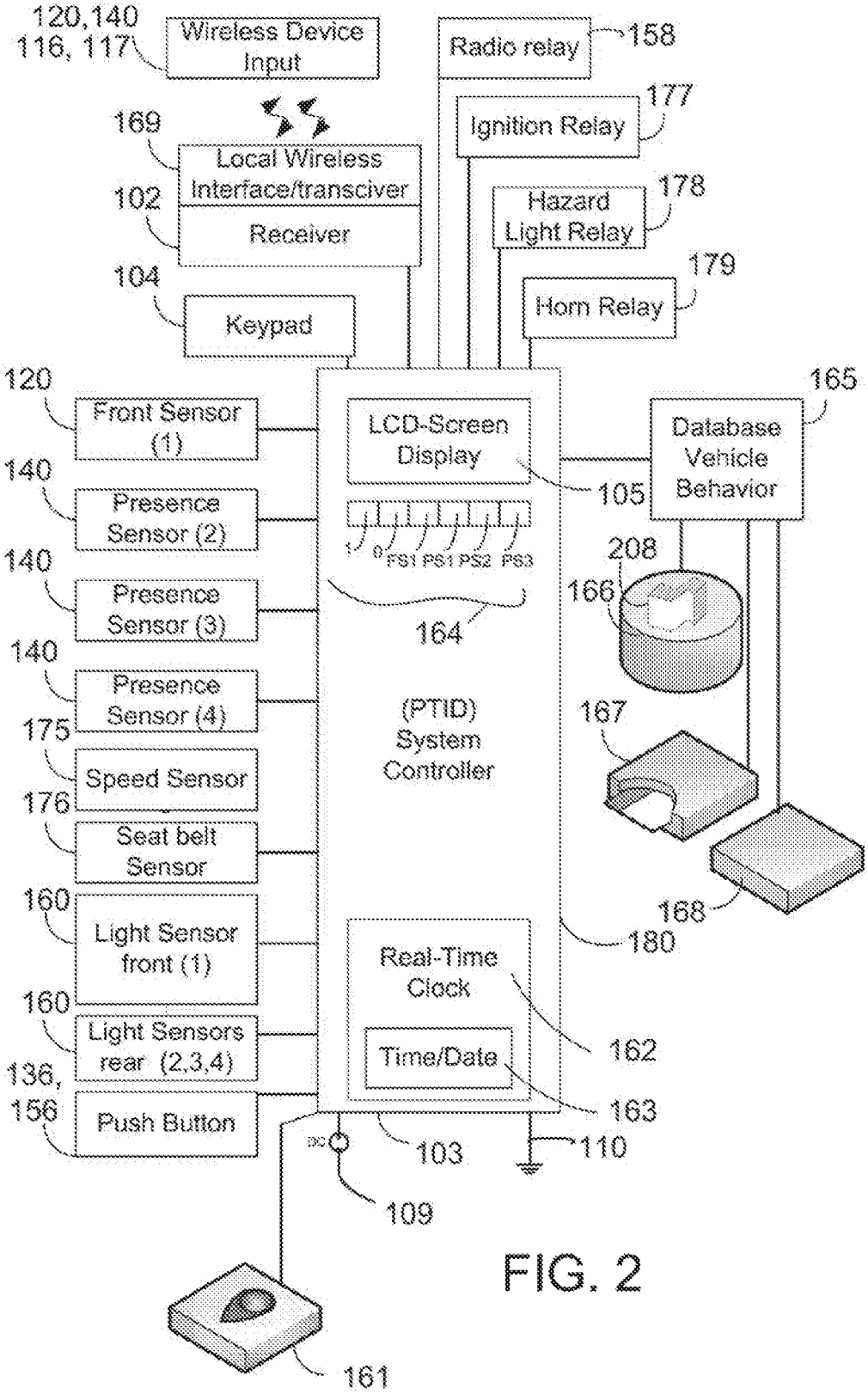
FIG. 2 illustrates a schematic view of the inputs to the computer device of the system according to the present invention.

Referring to FIG. 2, the receiver 102 and computing device 103 of the compliance monitoring device, system and method 100 is described with reference to a PTID System Controller 180. The system controller 180 is used for computational and compliance determinations. The system controller can display its status on a display 105 such as an LCD display of the machine, display of the smart phone 116, tablet 117, remote computer 115, or separately provided display 105 as illustrated in FIG. 1. A status of the device and system 100 can be displayed using LED's (1/ON Green, 0/OFF Red, Front Seat (FS) Sensor (signal from 120) ON/OFF Pink, Passenger Rear Seat (PS) Sensor (signal(s) from 140) ON/OFF Pink). The system controller 180 of the computing device 103 includes a real-time clock 162 and time and date information 163 useful for determining and calculating dawn/dusk, hours of operation, curfew, speed, and other time based calculations.

The system controller 180 may be formed to receive a variety of inputs from sensors and from input devices of restrictions, parameters, information and other settings in the setup and operation of the device and system 100. For example, sensor input from the front passenger sensor assembly 120, rear passenger sensor assembly 140, any speed sensor 175 information (i.e. from a GPS device, or from the machine's 101 internal measuring system), any seat belt sensor 176 information (i.e. from the machine's 101 internal measuring system), light sensor 160 information from the front and rear passenger sensor assemblies 120, 140, respectively, and additional sensors such as a biometric reader 161. Additionally, inputs from input devices of restrictions, parameters, information and other settings in the setup and operation of the device and system 100. For example, input from the receiver 102 including any wireless transceiver 169, the keypad 104, and wireless informational input from the App on a device, smart phone 116 or tablet 117 through a Wi-Fi or Bluetooth wireless interface and transmission.

The system controller 180 may be formed to generate a variety of outputs from information received from sensors and input devices regarding the status, setup and operation of the device and system 100. For example, input information on restrictions, parameters, information and other settings can be stored data 208 residing on storage 166, a card reader 167 or hard drive 168, as well as the information can be stored and accessed via wireless connection on a remote computer 115 and accessed in the cloud.

The system controller 180 is useful in energizing and de-energizing certain switches and/or relays so as to control the operation of machine 101 thought compliance with the predetermined information and sensors of the device and system 100. For example, the operating the machine 101 can be controlled by energizing and de-energizing the ignition relay 177 (FIG. 2). In certain situations when the machine 101 is already in operation and the user 'breaks' a preset restriction, the system controller 180 can be configured to not shut-off of the machine 101 (i.e. automobile) as this could create a safety problem. In such instances, a warning is contemplated to be issued to the user 170 such as in Steps 238, 239 and 241. The device and system 100 also can be configured to turn off the radio by de-energizing a radio relay 158 (FIG. 2), engage the hazard lights by energizing the hazard light relay 178 (FIG. 2) and/or sound the horn (if this option is selected) by energizing the horn relay 179 (FIG. 2), as well as to send a notification to the supervisor reporting the specific non-conforming action.

Figure 3:
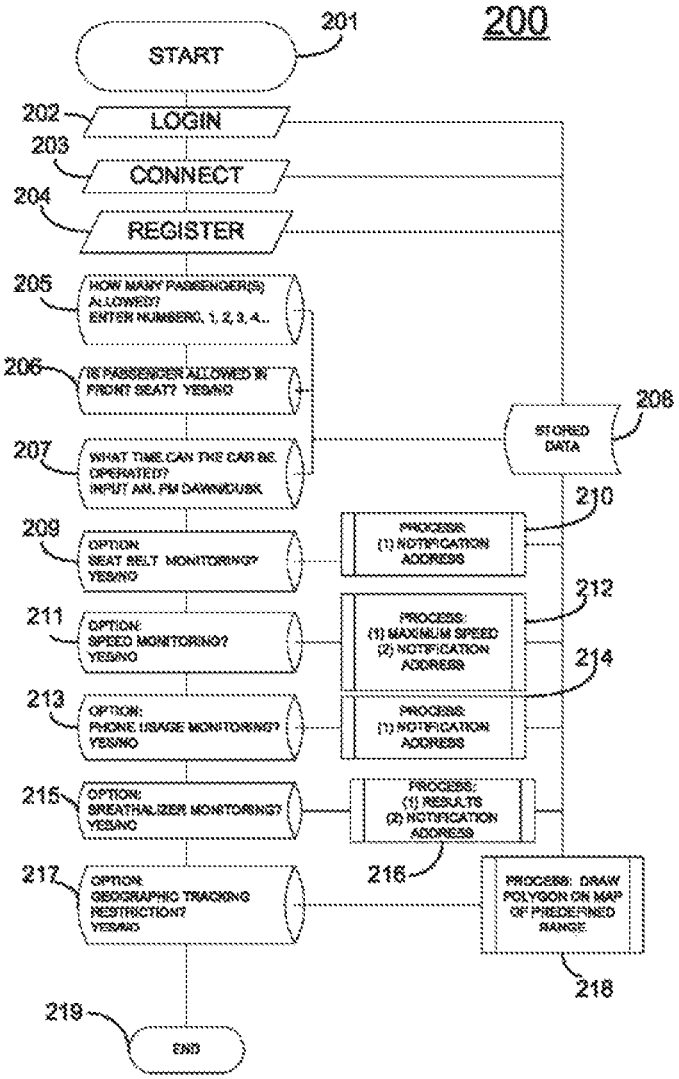
FIG. 3 illustrates a flowchart of establishing the restrictions and compliance setup according to an embodiment of the present invention.

Referring to FIG. 3, a flowchart of the method 100 of operating the device and system of to establish restrictions and compliance monitoring setup according to an embodiment of the present invention. The method 100 can be implemented in the hardware circuit and software 118 of the computing device 103 by way of firmware and software 118 as well as being notifying including a remote computer 115, a mobile application for use with the smart phone 116 and tablet 117. The software 118 application may control the operation of the system and data port to the hardware installed on the machine 101. The software 118 application will have several modes. One mode will be for set up and updating restrictions (used by the supervisor, parents, and the like). Another mode will be for use by the user 170 (e.g. the drivers of the automobile) of the machine 101 to initiate the operation thereof, whereby the software 118 application can be activated to connect to the hardware in the car, to then start the car.

As is illustrated in FIG. 3, an exemplary method of the present invention can be software or other computer-implemented process 200 for an initial set up of the system. Step 201 starts the setup of the system by the user initiating the software program, for example, after tapping an icon for the application or "App" will open and display three options: Log-In, Connect, and Register. Step 202 the login process by the supervisor or parent. For example, the supervisor logs in to view the user (i.e. user's driving activities by profile). After logging in, the supervisor can also adjust the specifications and accessed online via a regular website. Step 203 the Connect Step establishes what the User will see and select when he/she enters the machine 101 before being authorized to operate the machine 101 (i.e. automobile). After making this selection the App will pair to the device 116, 117 to the machine 101 and request the supervisor set up a User access code (keypad appears) for a particular user.

Step 204 a Register and initial Set-Up of the device 100 requires a supervisor to enter the supervisor's access code or individual identification number (ID #). The supervisors ID # is stored in the stored data 208. The device 100 also can be set up by a technician and any technicians ID# will be cross-referenced with a list of authorized registered installers and locations in order to prevent tampering. Once the correct ID# is inputted, a screen will display and request a 'user and device registration.' The supervisor will create a login ID# and password and that is stored data 208, which can be stored on the device 100, in the cloud at a remote computer 115, or paired to the supervisor's computer 115, smart phone 116 or tablet 117, each of the later can access the account on the computing device 103 via the receiver 102 such as, for example, by a Bluetooth wireless connection. The "pairing" of the supervisor, technician and user's accounts to the device and system 100 ensures that only authorized supervisor, technician and user's accounts installed will be able to enable the machine 101 in the appropriate way. It is contemplated that the registration process can include an insurance disclaimer and agreement on liability that the supervisor will electronically sign. At this point the supervisor can 'finish' the registration/installation process.

Referring to Steps 205 through 218, the supervisor can adjust the restrictions and items of compliance monitoring for the particular user and #ID. For example, in Step 205 the supervisor is requested to enter data of overall passenger monitoring, e.g. HOW MANY PASSENGER(S) ALLOWED And a particular number ENTER NUMBER 0, 1, 2, 3, 4 (i.e. as will correspond to sensors 127, 147 determining the presence of passengers 171, 172, 173, 174 of FIG. 1) based on the authorized restriction level of the user 170. The input will be stored as stored data 208 for the particular user ID#. In Step 206, the supervisor is requested to enter data of front seat passenger monitoring, e.g. IS PASSENGER ALLOWED IN FRONT SEAT? YES/NO, and such input will be stored as stored data 208 for the particular user ID#. In Step 207, the supervisor is requested to enter data of time of day, hours of operation, and curfew restriction and monitoring, e.g. WHAT TIME CAN THE CAR BE OPERATED? INPUT AM, PM DAWN/DUSK, and such input will be stored as stored data 208 for the particular user ID#. In another Step 209, the supervisor has the option to enter data of seat belt usage and monitoring, e.g. SEAT BELT MONITORING? YES/NO, and if YES Step 210 starts a corresponding PROCESS for information to set up seat belt monitoring and notifications, e.g. (1) NOTIFICATION ADDRESS, and such input will be stored as stored data 208 for the particular user ID#. In another Step 211, the supervisor has the option to enter data of speed monitoring, e.g. SPEED MONITORING? YES/NO, and if YES Step 212 starts a corresponding PROCESS for information to set up speed monitoring and notifications, e.g. (1) MAXIMUM SPEED (2) NOTIFICATION ADDRESS, and such input will be stored as stored data 208 for the particular user ID#. In Step 213, the supervisor has the option to enter data of phone usage restriction and monitoring, e.g. PHONE USAGE MONITORING? YES/NO, and if YES Step 214 starts a corresponding PROCESS for information to set up phone usage and notifications, e.g. (1) NOTIFICATION ADDRESS, and such input will be stored as stored data 208 for the particular user ID#. In Step 215, the supervisor has the option to enter data of sobriety restrictions by breathalyzer monitoring, e.g. BREATHALIZER MONITORING? YES/NO, and if YES Step 216 starts a corresponding PROCESS for information to set up breathalyzer testing using the user's phone with appropriate breathalyzer device attached to test and issue results and notifications, e.g. (1) RESULTS (2) NOTIFICATION ADDRESS, and such input will be stored as stored data 208 for the particular user ID#. In Step 217, the supervisor has the option to enter data of GPS location and travel restrictions and monitoring, e.g. GEOGRAPHIC TRACKING RESTRICTION? YES/NO, and if YES Step 218 starts a corresponding PROCESS for information to set up breathalyzer testing using the user's phone with appropriate breathalyzer device attached to test and issue results and notifications, e.g. DRAW POLYGON ON MAP OF PREDEFINED RANGE, and such input will be stored as stored data 208 for the particular user ID#. The above listed restrictions are exemplary and other restrictions and monitoring of the user's activities and operation of the machine 101 are contemplated and can be implemented in a similar manner. Once all of the set-up processes and information is collected and stored, in Step 219, initial set-up of the device and system 100 and or a particular user is completed.

Figure 4:
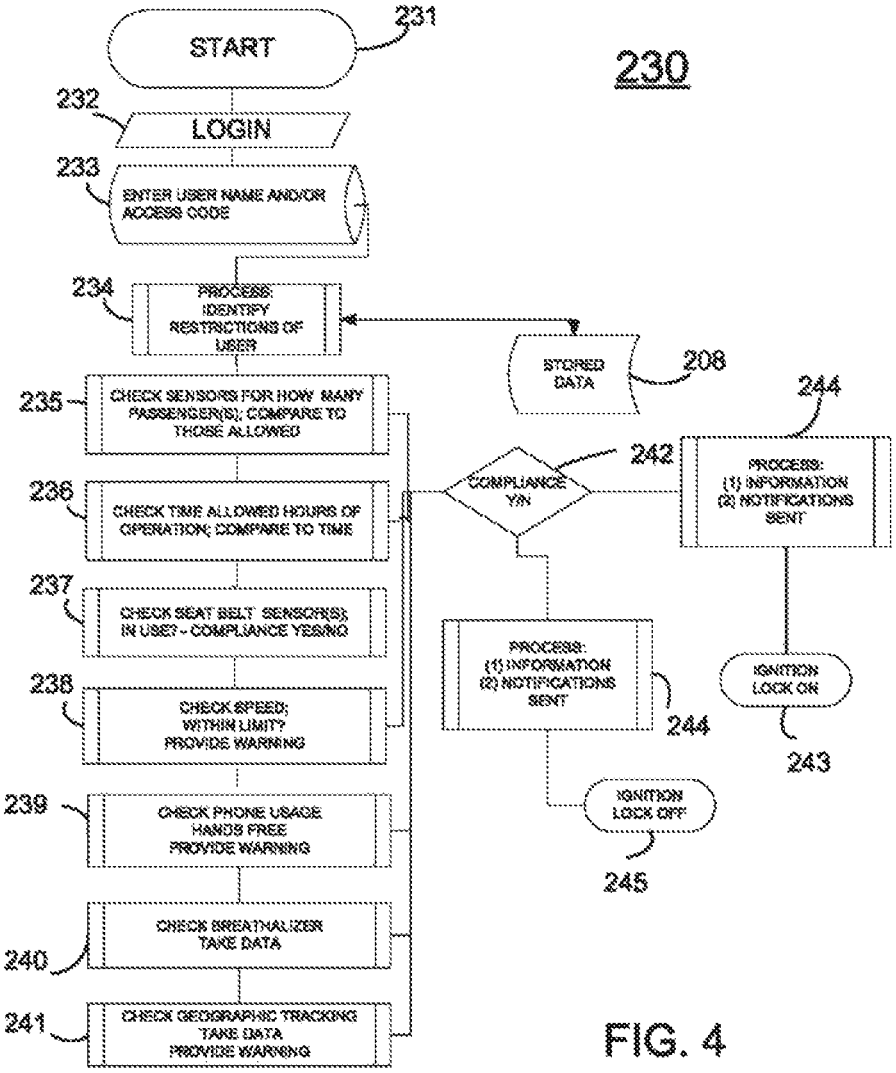
FIG. 4 illustrates a flowchart of the operation according to an embodiment of the present invention.

Referring to FIG. 4, a flowchart of the operation 230 of the system and method 100 according to an embodiment of the present invention. Step 231 initiates the operation of the device and system 100 by the user, (e.g. driver 170) initiating the software program, for example, after tapping an icon for the application or "App" will open and display a Login screen. Step 232 the login process requests the user's ID#, name and/or access code. Step 233 Entering a User's ID#, name and/or access code will start a process of verification, cross-referencing stored data 208 on a computing device 103, which also can be in the cloud or stored on a remote computer or server 115, and retrieval of previously set restrictions and monitoring (that supervisor or parent created in the process 200). Step 234 a process occurs to compare stored data 208 for the specific user to identify the user, any restrictions for the user, as the User's access code will have to match up with the specific device (Serial #) installed on the particular device and system 100 associated with the machine 101. After the User 170 inputs his/her ID#, name and/or access code, Steps 235 through 241 implement information and process checks for whether or not any of the restrictions are broken or, alternatively, the compliance of the restrictions and modifications in Steps 235-241 as set by the supervisor for the particular user 170. For example, in Step 235, the device and system 100 performs compliance and monitoring by checking the front and rear seat passenger sensors 120, 140, e.g. CHECK SENSORS FOR HOW MANY PASSENGER(S); COMPARE TO THOSE ALLOWED. In Step 236, the device and system 100 performs compliance and monitoring of the time allowed by checking the internal clock, the light sensor(s) 160, or date and time comparing to almanac information in stored data, e.g. CHECK TIME ALLOWED HOURS OF OPERATION; COMPARE TO TIME.

In Step 237, the device and system 100 performs compliance and monitoring of the use of seat belts by checking the seat belt sensor(s) in the car, e.g. [HECK] *CHECK* SEAT BELT SENSOR(S); IN USE?—COMPLIANCE YES/NO. In Step 238, the device and system 100 performs compliance and monitoring of the speed(s) the user 170 is operating the machine 101 by checking GPS location information, speedometer output information to the operating limitations set by process 200, e.g. CHECK SPEED; WITHIN LIMIT? PROVIDE WARNING. In Step 239, the device and system 100 performs compliance and monitoring of the use of a mobile telephone during the user's 170 operation of the machine 101, e.g. CHECK PHONE USAGE; HANDS FREE? YES/NO PROVIDE WARNING. In Step 240, the device and system 100 performs compliance and monitoring of the user's 170 sobriety prior to the operation of the machine 101, e.g. CHECK BREATHALIZER; TAKE DATA. For example, a breathalyzer used to determine the BAC for this App can be the Breathometer (https://www.breathometer-.com). In Step 241, the device and system 100 performs compliance and monitoring of the geographic location of the user 170 to determine if within the operating range permitted for the machine 101 by checking GPS location information and other operating limitations set by process 200, e.g. CHECK GEOGRAPHIC TRACKING TAKE DATA PROVIDE WARNING. If in compliance of the check of Steps 235-241 the user 170 will be allowed to operate the machine 101. For example, device and system 100 determines if in compliance Step 242 IN COMPLIANCE? YES/NO, if YES, then none of the restrictions are broken, and a PROCESS to log and send any notifications will be initiated by Step 244 and the machine 101 will be allowed to start in Step 245 by turning off the ignition lock. Step 242 if any of the restrictions are broken, if NO, the machine 101 will not be allowed to start in Step 243 as the ignition lock will remain ON, and a PROCESS to log and send any notifications will be initiated by Step 244 to the supervisor (if they required it).

It is to be appreciated that if the user is operating the machine 101 and 'breaks' a preset restriction, the ignition lock 106 of the machine 101 (i.e. automobile) will not shut-off by de-energizing the ignition relay 177 (FIG. 2) as this could create a safety problem. A warning is contemplated to be issued to the user 170 such as in Steps 238, 239 and 241. The device and system 100 also can be configured to turn off the radio by de-energizing a radio relay 158 (FIG. 2), engage the hazard lights by energizing the hazard light relay 178 (FIG. 2) and/or sound the horn (if this option is selected) by energizing the horn relay 179 (FIG. 2), as well as to send a notification to the supervisor reporting the specific non-conforming action.

Figure 8:
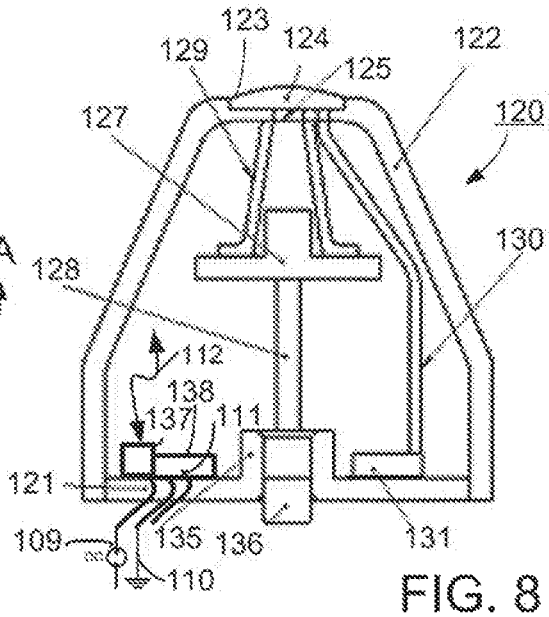
FIG. 8 illustrates a schematic, side view of the front passenger sensor assembly, taken along lines A-A of FIG. 7.

Referring to FIGS. 5-8, the front passenger sensor assembly 120 is configured and may be formed with a base 121 and a cover 122 configured to fit over the base 121. The cover 122 has a recess 123 located distal from the base 121 and is 129 adapted to receive a lens 124 in the recess 123. The recess 123 further is configured with an IR hole 125 for receiving infra-red light and a hole 126 for receiving visible light. As shown in FIGS. 1, 2 and 8, the front passenger sensor assembly 120 can be supplied with power 109, ground 110, and data signals along line 111 to the assembly. Alternatively, the front passenger sensor assembly 120 can be self contained using a wireless transceiver 137 and battery 138 to transmit sensor signals via wireless 112 transmission to the computing device 103.

Figure 22:
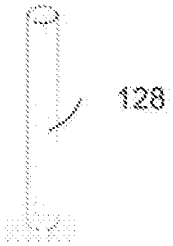
FIG. 22 illustrates a schematic, perspective view of a stanchion according to the present invention.

The base 121 and cover 122 enclose a PIR sensor 127, light guide 130 and circuitry 131 to provide detection and to protect from environmental conditions and tampering. The base 121 may be formed with an opening 135 configured to hold a button 136 disposed therein configured to be affixed, for example, by adhesive to windows, ceilings and the like, whereby the button 136 release from the opening 135 staying with the adhesive as a fail-safe to prevent tampering. For example, as a fail-safe the button 136 inserted in the opening 135 to "close" a switch so that the machine 101 can be operated if all required inputs allow (e.g., sensor inputs 120, 140, 175, 176, 160, 161) and if removed from its mounting the button 136 disengages to an "open position" causing a break in the switch output whereby the front passenger sensor assembly 120 indicates tampering of the device and operation of the machine 101 is not allowed The button 136 switch can receive power from the battery 138 or, alternatively, line 111 power 109 and ground 110. On one side, the PIR sensor 127 is supported upon the base 121 by one or more stanchions 128, and on the other side is positioned at the larger end of a cone 129 configured to collect and condense IR signals through the IR hole 125 to the PIR sensor 127 for detection by the control circuitry 131. As shown in FIG. 22, the stanchion 128 may be formed of a generally cylindrical post and made from suitable materials such as metals and plastics to support and maintain the PIR sensor 127 in place.

Figure 5:
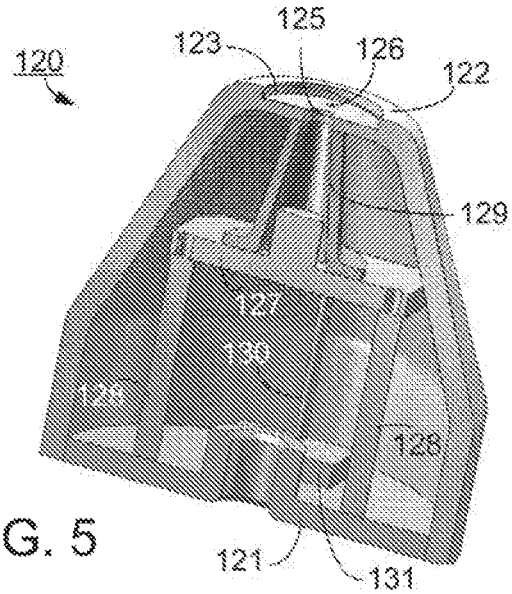
FIG. 5 illustrates a schematic, perspective view of the front passenger sensor, taken along lines A-A of FIG. 7, according to the present invention.
Figure 6:
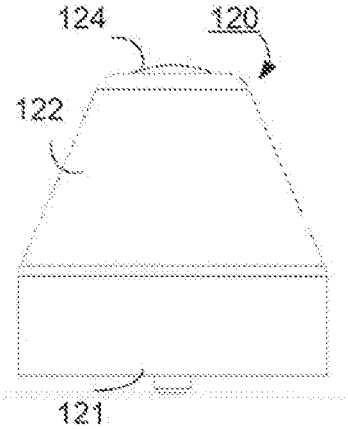
FIG. 6 illustrates a side view of the front passenger sensor.
Figure 7:
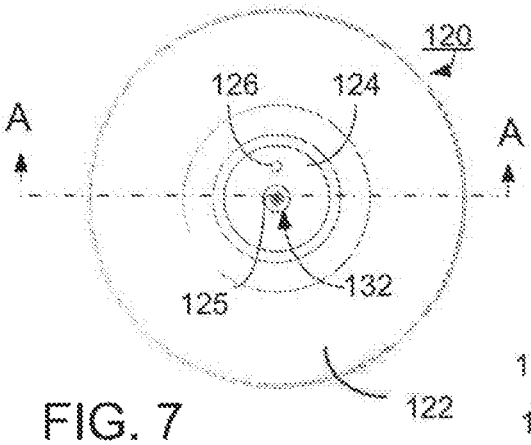
FIG. 7 illustrates a top view of the front passenger sensor.
Figure 9:
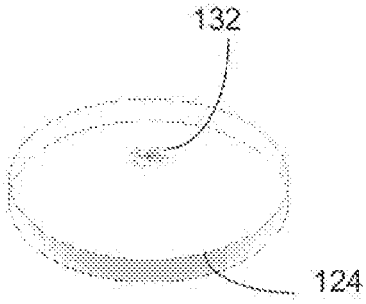
FIG. 9 illustrates a schematic, perspective view of a lens front passenger sensor.
Figure 19A:
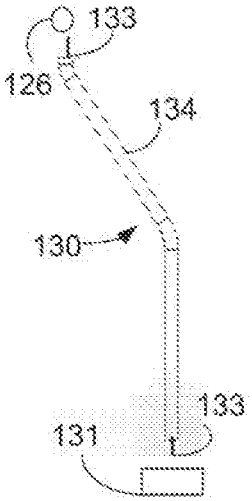
FIGS. 19A, 19B and 19C illustrates a schematic, side views of the light guides, fiber optic cables and light sensor assemblies for the front and rear passenger sensor assembly.
Figure 19B:
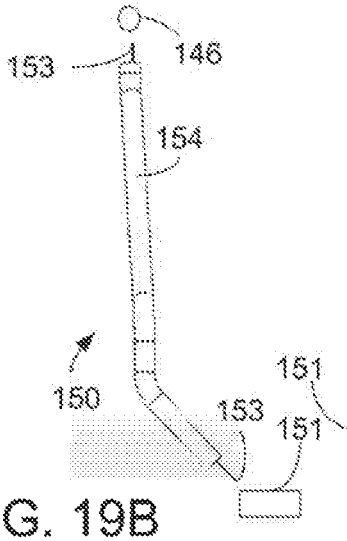
Figure 19C:
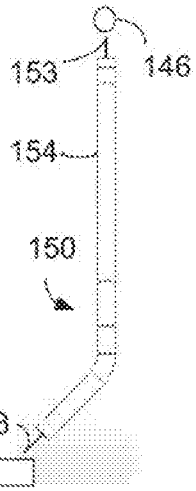

As shown in FIG. 9, the lens 124 can have optics 132 (e.g. Fresnel lens) for focusing and directing predetermined wavelengths to the control circuitry 131 and PIR sensor. The light sensor assembly 160 of the front passenger sensor assembly 120 includes a light guide 130 disposed adjacent the hole 125 allowing visible light therethrough. As shown in FIG. 19A, a light guide 130 for the front passenger sensor assembly 120 may be formed by a tube 133 and optical fiber 134 so as to receive visible light from hole 125 and convey the light to the control circuitry 131 (i.e., circuitry to control signal operation of the PIR sensor, light sensor, wireless transceiver, power and the like) for detection as shown in FIGS. 2, 5, and 19A. As shown in FIGS. 19B and 19C, a light guide 150 for the rear passenger sensor assembly 140 may be formed by a tube 153 and optical fiber 134 so as to receive visible light from hole 155 and convey the light to the control circuitry 151 for detection as shown in FIGS. 2, 11, 19B and 19C. The light guides 130 and 150, alternatively, can be formed from conventional flexible, fiber optic cable.

In another embodiment, in order to prevent tampering by a user covering the light sensor with tape, or any other disruptive object, the time of day may be computed by a comparison of the real time clock 162, time and date 163 information (FIG. 2) with almanac data, GPS (time zone data), and daylight savings time data to compute curfew, dusk/dawn and other time of day licensure restrictions. Moreover, prior to initiation providing light from the machine 101 to the light sensor 160 at night, or another light such as such as an LED can be added, so that positive light sensing by the light sensor 160 can be afforded prior to operation to ensure that there is no covering of the PIR sensor 127, 147 with tape or other ways to defeat the passenger restriction.

Figure 15:
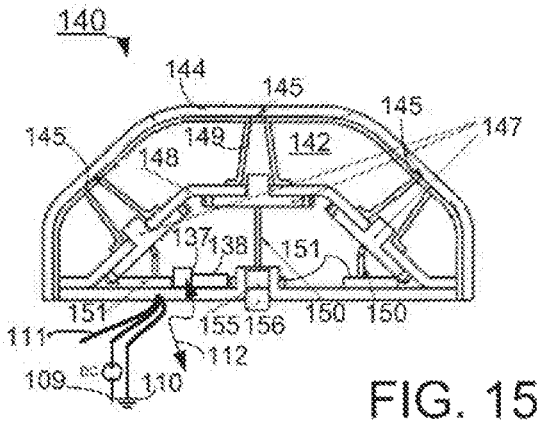
FIG. 15 illustrates a side view of the rear passenger sensor assembly, taken along lines B-B of FIG. 14.
Figure 16:
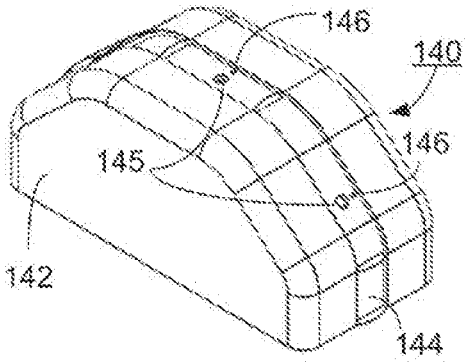
FIG. 16 illustrates a side view of the rear passenger sensor assembly.
Figure 17:
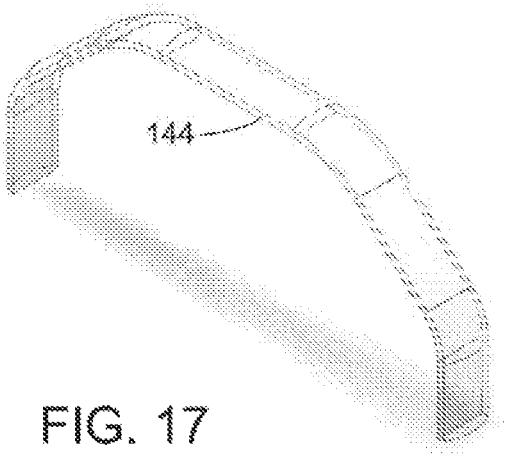
FIG. 17 illustrates a schematic, perspective view of a elongated lens cover of the rear passenger sensor assembly.
Figure 18:
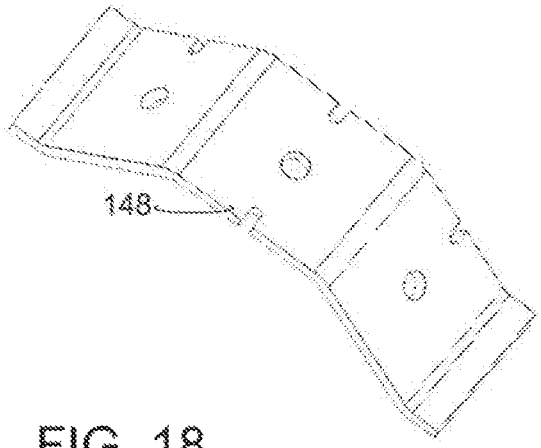
FIG. 18 illustrates a schematic, perspective view of sensor mounting plate of the rear passenger sensor assembly.

Referring to FIGS. 11-16, similarly, the rear passenger sensor assembly 140 is configured and may be formed with a base 141 and a cover 142 configured to fit over the base 141. The cover 142 has a recess 143 located distal from the base 141 adapted to receive a lens 144 in the recess 143. The recess 143 further is configured with one or more IR holes 145 for receiving infra-red light and one or more holes 146 for receiving visible light. The base 141 and cover 142 enclose a PIR sensor 147, light guide 150 and circuitry 151 to provide detection and to protect from environmental conditions and tampering. As shown in FIGS. 1, 2 and 15, the rear passenger sensor assembly 140 can be supplied with power 109, ground 110, and data signals along line 111 to the computing device 103. Alternatively, the rear passenger sensor assembly 140 can be self-contained using a wireless transceiver 137 and battery 138 to transmit sensor signals via wireless 112 transmission to the computing device 103.

The base 141 may be formed with an opening 155 configured to can include a fail-safe switch formed from an opening 155 and a button 156 such as, for example, when the push button 156 is normally "closed" the fail-safe switch is closed so that the machine 101 can be operated if all required inputs allow (e.g., sensor inputs 120, 140, 175, 176, 160, 161) and if removed from its mounting the push button disengages to an "open position" causing a break in the switch output whereby the rear passenger sensor assembly 140 indicates tampering of the machine 101 and operation of the machine 101 is not allowed. Similar to the base 121, the base 141 can be affixed to the windshield, ceiling or corner utilizing adhesives that interacts and secures to button 156 so that tampering removes button 156 from opening 155 and opens the fail-safe switch. On one side, one or more PIR sensors 147 are supported upon the base 141 by a sensor mounting plate 148, and on the other side are positioned at the larger end of one or more cones 149 configured to collect and condense IR signals through each of the IR holes 145 to each of the PIR sensors 147 for detection by the control circuitry 151 (i.e., circuitry to control signal operation of the PIR sensor, light sensor, wireless transceiver, power and the like). The lens 144 can have optics 152 (e.g. Fresnel lens, curvature, and the like) for focusing and directing predetermined wavelengths to the control circuitry 151 and PR sensors 147. The light sensor assembly 160 of the rear passenger sensor assembly 140 includes a light guide 150 disposed adjacent the hole 145 allowing visible light therethrough. Similarly, as described herein, the light guide 150 may be formed by a tube 153 and optical fiber 154 so as to receive visible light from hole 145 and convey the light to the control circuitry 151 for detection as shown in FIGS. 2, 11, 19B and 19C.

Figure 10:
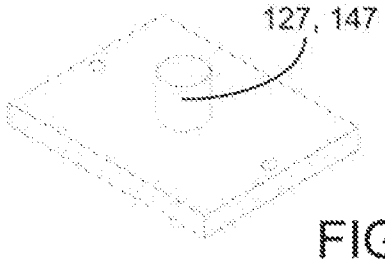
FIG. 10 illustrates a schematic, perspective view of a PIR sensor.
Figure 11:
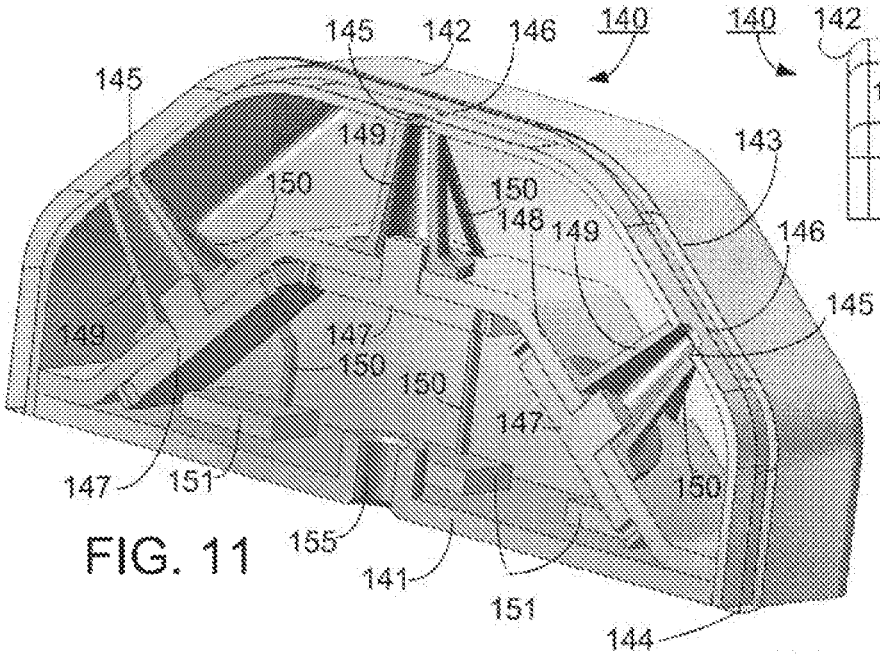
FIG. 11 illustrates a schematic, perspective view of a rear passenger sensor assembly, taken along lines B-B of FIG. 14, according to the present invention.
Figure 12:
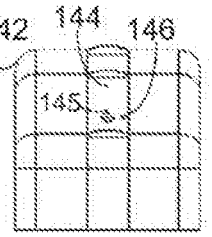
FIG. 12 illustrates an end view of the rear passenger sensor assembly.
Figure 13:
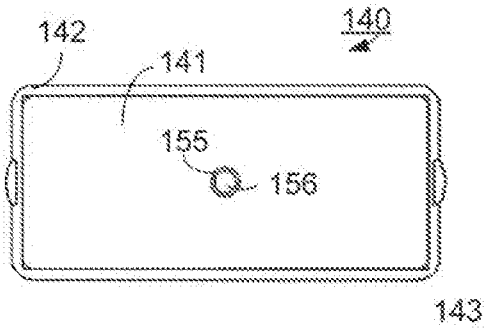
FIG. 13 illustrates a bottom view of the rear passenger sensor assembly.
Figure 14:
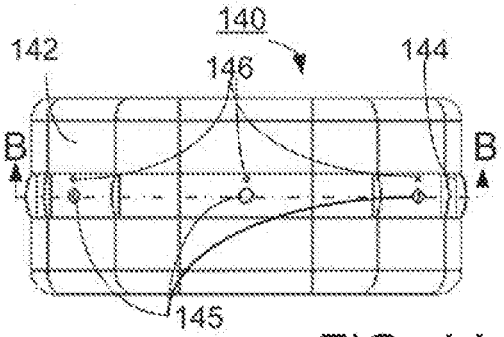
FIG. 14 illustrates a top view of the rear passenger sensor assembly.

Referring to FIG. 10, a presence infra-red electronic (PIR) sensor 127, 147 is an electronic sensor that measures infra-red (IR) light radiating from objects in its field of view. As shown in FIG. 9, a typical assembly includes the lens 124, 144 for condensing the IR light to parallel (numerous Fresnel lenses or mirror segments), has an effective range of about ten meters (thirty feet), and a field of view less than 180 degrees. The PIR sensor 127 is configured in the front passenger sensor assembly 120 and one or more PIR sensors 147 are used in the rear passenger sensor assembly 140 and are typically mounted on a printed circuit board containing the necessary electronics required to interpret the signals from the PIR sensor 127, 147 itself. The lens 124, 144 can be made from plastic to create a "window" through which the infrared energy can enter and; despite often being only translucent to visible light, infrared energy is able to reach the sensor through the window because the plastic used is transparent to infrared radiation. For example, lens 124 may be formed circular to fit in the recess 123 of base 122 with optics 132 such as, for example, a convex shape with a Fresnel lens pattern as is illustrated in FIG. 9. Similarly, as is shown in FIG. 1, lens 144 can be configured to wrap around the cover 142 and fit in the recess 143. The plastic lens 124, 144 further reduces the chance of foreign objects (dust, insects, etc.) from obscuring the PIR sensors' 127, 147 field of view, damaging the mechanism, and/or causing false alarms. The window may be used as a filter, to limit the wavelengths to 8-14 micrometers, which is closest to the infrared radiation emitted by humans and serve as a focusing mechanism.

As shown in FIGS. 1, 11, 12, 14-16 and 18, the sensor mounting plate 148 may be used to mount one or more PIR sensors 147 in a predetermined orientation so as to determine the presence of multiple passengers in the rear seat from the passenger's IR signal, e.g. passengers 172, 173, and 174 as the sensor(s) 147 position is angularly directed to the particular seating positions as is illustrated in FIG. 1. Similarly, as is shown in FIGS. 5, 8, 11, and 19A, 19B and 19C, the light guides 130, 150 can be formed from suitable materials having an optical fiber or fiber 134, 154 disposed within a tube 133, 143. The light guides 130, 150 with angular curves to fit within a particular cover design, for example, light guide 130 is designed to the shape of the cover 122 of the front passenger sensor assembly 120 as shown in FIG. 19A and light guide 150 can be designed for the cover 142 of the rear passenger sensor assembly 140 as shown in FIGS. 19B and 19C.

Figure 20:
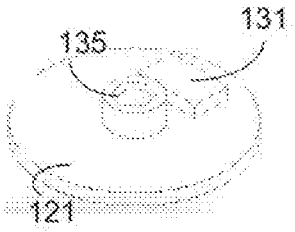
FIG. 20 illustrates a schematic, perspective view of base of the front passenger sensor assembly.

As is illustrated in FIG. 20, the base 121 can be formed from suitable materials in a circular shape so as to be received in the cover 122. The base 121 may be formed with control circuitry 131 such as, for example, power for a wireless transmitter, for the PR sensor 127, optical light circuitry for the optical sensor 160 and light guides 130 and the like. The base 121 may be formed with an opening 135 for receiving a magnet, use of a fastener and passing lines 111 to the control circuitry 131, if directly connected by lines 111 to the computer device 102.

Figure 21:
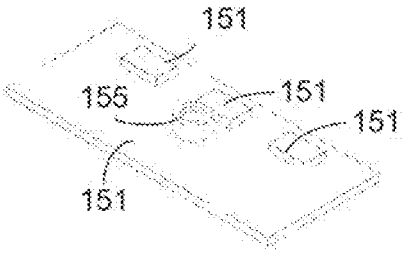
FIG. 21 illustrates a schematic, perspective view of base of the rear passenger sensor assembly.

As is illustrated in FIG. 21, the base 151 can be formed from suitable materials in a rectangular shape so as to be received in the cover 142. The base 141 may be formed with control circuitry 151 such as, for example, power for a wireless transmitter, for the PIR sensors 147, optical light circuitry for the optical sensor 160 and light guides 150 and the like. The base 151 may be formed with an opening 155 for receiving a magnet, use of a fastener and passing lines 111 to the control circuitry 131, if directly connected by lines 111 to the computer device 102.

Alternate embodiments of the present invention, the restriction and compliance monitoring device, system and method 100 may be incorporated by a vehicle manufacturer, at the factory, in order to integrate the present invention seamlessly into the dashboard of a vehicle. In this manner, lines 111 may be run behind the headliner or with other wiring to the appropriate areas, and the receiver 102, computing device can be securely located so as to prevent tampering. The input or keypad 104 and display 105 (also shown in the center console of the vehicle in FIG. 1) functionality can be integrated in the existing vehicle control module could so as to utilize any display and input in the dash of the vehicle in order to accept the setup information and input of the user. Subsequently, incorporation in this way within the dash of the vehicle makes it very hard to tamper with. Bluetooth technology, conventionally equipped in vehicles from the factory, may be employed in this embodiment of the present invention to utilize a cellular device, smart phone or other device with an application running thereon to setup, and control any input with the device.

The device system and method 100 can provide speed monitoring. For example, sending a notification to the supervisor if the machine goes over a certain speed by monitoring the signals from the machine 101, and, in the case of an automobile, if the car goes over 80 MPH, then send notification and store details such as average difference between the speed limit and speed of vehicle.

The device system and method 100 can provide location monitoring. If GPS feature is enabled by the supervisor to track the machine 101 it will consistently be tracked using GPS and storing the data 208 for a certain length of time (e.g. the past 2 weeks of travel). In the set-up of the device system and method 100 the supervisor can utilize graphics such as, for example, to draw a polygon on a map that shows the areas where the user 170 can operate. The system 100 can determine if the user 170 exits this range of GPS coordinates and the supervisor will get a notification. Moreover, there can be data stored 208 and displayed on a map showing the locations were the machine 101 has travelled with differentiation for different users (i.e. different colors for different drivers). The method of operation 100 can use a maps platform:

If the GPS position of the car is within the coordinates of the polygon
then do nothing
If the GPS position of the car is outside the coordinates of the polygon
then send parents notification The device system and method 100 can provide Cell-Phone Use restriction. The system 100 may be configured with a charger for the cell, mobile or smart phone 116 that the user 170 can plug into. In an automobile operation, in order to start the machine 101 the user's 170 smart phone 116 communicates the user's ID# with the receiver 102 computing device 103 via wireless 112 (i.e. Bluetooth) and the to communicate with the server 115 or storage 166 for restriction cross-referencing. Once the machine 101 is started and is in operation, the smart phone 116 and application stays open on the smart phone 116 to lock out texting, phone calls, and other restricted distracting features other than permitted features warnings, communications from supervisor, GPS location, directions, music, and the like. After the user 170 enters his/her pass code and/or ID#, the lock out feature on the phone automatically responds to incoming text messages with a response as well as phone calls with voice mail or the like i.e. the smart phone 116 doesn't shut off while the App is on during operation of the machine, while the ignition relay is on.

The device system and method 100 can provide a breathalyzer feature and restriction. If breathalyzer feature is enabled by the supervisor to track the machine 101, the supervisor can establish: requirements for all driving or certain periods of time (i.e. teens may not statistically drink Monday-Thursday, but usually between Friday evening and Sunday morning). The system 100 can use the smart phone

116 to connect to a breathalyzer used to determine the BAC such as, for example, available Breathometer (https://www.breathometer.com).

The method 100 can use an App, for example, Is your User _____(name) required to supply a breath sample before driving?" If Yes, the App will ask at what times? The supervisor can then input the interval, for example, Friday @ 4 PM-Sunday @ 8 AM. When the user inputs the user's ID# during this time interval, the App will ask for a breath sample, the user will plug the small breathalyzer into their smart phone 116 and provide the sample. If the sample is 'less than' the maximum BAC the vehicle or machine 101 will be allowed to start. If the sample is 'greater than or equal to the maximum BAC' the vehicle or machine 101 will not be allowed to start and the supervisor will receive a notification. If while driving the device asks for an additional sample and the driver does not pull over within "X" minutes, a notification will be sent to the supervisor and one of the following can occur: the radio will turn off, the horn sounds, the hazard lights will "go-off" to warn other drivers of a potential drunk driver.

While certain configurations of structures have been illustrated for the purposes of presenting the basic structures of the present invention, one of ordinary skill in the art will appreciate that other variations are possible which would still fall within the scope of the appended claims. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A system for compliance monitoring the user of a machine using a system controller which is connected to the machine, comprising:

an input device integrated in the system controller and configured to provide an input to the system controller so as to configure one or more predetermined restrictions for a user in order to operate the machine, said input is communicated to a storage of the system;

a display device integrated in the system controller and configured to display said input to the system controller;

at least one sensor configured to communicate sensor information to the system controller, said sensor information concerning compliance with said predetermined restrictions, a fail-safe assembly for compliance with said predetermined restrictions, said fail-safe assembly [includes a light sensor associated with each sensor associated with a seat in the machine, each of said light sensors] configured to provide sensor information from said fail-safe assembly about tampering with [said predetermined restrictions] *the at least one sensor*;

an energy store configured to provide power to at least the system controller;

and an output signal [configured to restrict operation of the machine] *from the at least one sensor* when said sensor information is not in compliance with said predetermined restrictions*;* whereby [said sensor information] the compliance monitoring system allows operating the machine when the user is in compliance with an allowable passenger restriction regarding presence of a front passenger, one or more passenger in [the] *a* rear seat, or both, obtained from said at least one sensor.

2. The system for compliance monitoring of claim 1, further comprises, a receiver integrated in the system controller, and configured to provide a wireless interface to receive data from *the at least one sensor, which comprises* one or more of the group of a front seat presence sensor, a light sensor of said front seat presence sensor, a rear seat presence sensor, a light sensor of said rear seat presence sensor, a seat belt sensor, *a global positioning system,* an identity of the user, a biometric identity of the user sensor or a breathalyzer test to the system controller to configure for said [restriction] *one or more restrictions* for said user in order to operate the machine.

3. The system for compliance monitoring of claim 1, whereby the system controller is [further] configured[,] to receive input sensor information from *the at least one sensor, which comprises* one or more of the group of a front seat presence sensor, a light sensor of said front seat presence sensor, a rear seat presence sensor, a light sensor of said rear seat presence sensor, a seat belt sensor, *a global positioning system,* an identity of the user, a biometric identity of the user sensor or a breathalyzer test; and to restrict operation of the machine when the sensor information is not in compliance with said one or more restrictions.

4. The system for compliance monitoring of claim 1, wherein said input device is a smart phone, cell phone, tablet computer, *built-in computer,* or remote computer communicating said input of an identity of a predetermined, authorized user and said sensor information into *said* system controller to restrict operation of the machine to said predetermined, authorized user when the sensor information [are] *is* in compliance with said predetermined restrictions.

5. The system for compliance monitoring of claim 4, wherein said system controller receives said sensor information from the *at least one sensor, which comprises one or more of the* group of a front seat presence sensor, a light sensor of said front seat presence sensor, a rear seat presence sensor, a light sensor of said rear seat presence sensor, a seat belt sensor, *a global positioning system,* a speed sensor subsequent to ignition of the machine; and allows operation of the machine to said predetermined, authorized user when the sensor information are in compliance with said predetermined restrictions.

6. The system for compliance monitoring of claim 5, wherein once the machine is in operation said system controller is operably connected *to* one of the group of said smart phone, said cell phone, [or] said tablet computer*, said built-in computer, or said remote computer* that provided said input of said identity of a predetermined, authorized user, said system controller further disables texting, phone calls, and other restricted distracting features other than permitted features, warnings, communications from supervisor, GPS location, directions, *or* music[, and the like].

7. The system for compliance monitoring of claim 1, wherein said system controller receives said sensor information indicating non-compliance from *the at least one sensor, which comprises* one or more of the group of a front seat presence sensor, a light sensor of said front seat presence sensor, a rear seat presence sensor, a light sensor of said rear seat presence sensor, a seat belt sensor, *a global positioning system,* an identity of the user, a biometric identity of the user sensor or a breathalyzer test prior to ignition of the machine.

8. The system for compliance monitoring of claim 1, wherein [said system controller receives said sensor information from the group of a front seat presence sensor, a light sensor of said front seat presence sensor, a rear seat presence sensor, a light sensor of said rear seat presence sensor, a seat belt sensor, a speed sensor subsequent to ignition of the machine; and]

said system controller [restricts operation of the machine] *is configured to enforce an allowable passenger restriction* when the sensor information is not in compliance with said one or more restrictions by one or more of the following:

Opening a radio relay to turn off a radio in the machine;

Closing a hazard light relay to turn on a hazard light of the machine; [or]

Closing a horn relay to sound a horn of the machine*; or sending a notification concerning compliance with said predetermined restrictions*.

9. The system for compliance monitoring of claim 1, wherein said system controller receives information from a real-time clock and a time of day predetermined restriction for operation of the machine and allows operation of the machine to [said] *a* predetermined, authorized user when the time of day information [are] *is* in compliance with said predetermined [restrictions] *restriction*.

10. A method for compliance monitoring of a user of a machine comprising:

Supplying a user identification [number] to a computing device connecting to an ignition relay of the machine;

Retrieving stored data regarding one or more predetermined [restriction(s)] *restrictions* of the user for operating the machine from storage connected to the computing device;

Retrieving sensor information from one or more sensors arranged in the machine and fail-safe information about tampering with [said predetermined restrictions from a light sensor associated with each of said one or more sensors associated with a seat in the machine configured to provide such fail-safe information] *one or more of said one or more sensors*;

Comparing sensor information to said predetermined restriction(s) of the user; and

[Restricting operation of the machine when the sensor information is not in compliance with said predetermined restrictions using an output signal from said one or more sensors] whereby said sensor information of the compliance monitoring system allows operating the machine when the user is in compliance with an allowable passenger restriction regarding either a presence of a front passenger, one or more passenger in the rear seat, or the total number of allowable passenger(s) in the machine obtained from said one or more sensors.

11. The method of claim 10, wherein said [preventing] *sensor information prevents* operation of the machine when a front seat sensor assembly indicates non-compliance with [one of] said [predetermined restrictions] *allowable passenger restriction by* preventing an ignition relay from closing so that of the machine may *not* be started.

12. The method of claim 10, wherein said [preventing] *sensor information prevents* operation of the machine when a rear seat sensor assembly indicates non-compliance with [one of] said [predetermined restrictions] *allowable passenger restriction by* preventing an ignition relay from closing so that of the machine may not be started.

13. The method of claim 10, wherein said [preventing] *sensor information prevents* operation of the machine when at least a sensor from one or more of the group of a front seat presence sensor, a light sensor of said front seat presence sensor, a rear seat presence sensor, a light sensor of said rear seat presence sensor, a seat belt sensor, *a global positioning system,* an identity of the user, a biometric identity of the user sensor or a breathalyzer test indicates non-compliance with one of said predetermined restrictions preventing an ignition relay from closing so that of the machine may not be started.

14. The method of claim 10, wherein once said operation of the machine begins, the method provides the further steps of:

comparing sensor information with at least a sensor from the group of a front seat presence sensor, a light sensor of said front seat presence sensor, a rear seat presence sensor, a light sensor of said rear seat presence sensor, a seat belt sensor, *a global positioning system,* an identity of the user, a biometric identity of the user one or more of or a speed sensor information to said predetermined restriction(s) of the user;

determining non-compliance with one of said restrictions restricting operation of the machine when the sensor information is not in compliance with said one or more restrictions by one or more of the following:

opening a radio relay to turn off a radio in the machine;

closing a hazard light relay to turn on a hazard light of the machine; and/or closing a horn relay to sound a horn of the machine.

15. The method of claim 10, further comprising the steps of:

supplying said user identification [number] of a predetermined, authorized user to said system controller from one of a group of a smart phone, cell phone, [or] tablet computer*, built-in computer, or remote computer* connecting to an ignition relay of the machine; and closing an ignition relay allowing operation of the machine by said predetermined, authorized user when the sensor information are in compliance with said predetermined restrictions.

16. The method of claim 15, further comprising the steps of:

disabling texting, phone calls, and other restricted distracting features other than permitted features warnings, communications from supervisor, GPS location, directions, music, and the like once the machine is in operation said system controller is operably connected one of the group of said smart phone, said cell phone, or said tablet computer that provided said input of said identity of a predetermined, authorized user.

17. The method of claim 10, further comprising the steps of:

supplying information from a real-time clock to said system controller;

comparing a time of day with a predetermined restriction for operation of the machine based on time of day for said predetermined, authorized user; and closing an ignition relay allowing operation of the machine by said predetermined, authorized user when the time of day information are in compliance with said predetermined restrictions.

18. A system for compliance monitoring the user of a machine using a system controller which is connected to the machine, comprising:

one or more sensors operably coupled to said system controller configured to provide input signals regarding the presence of one or more passengers in predetermined locations in the machine;

a fail-safe assembly [for compliance with said predetermined restrictions], said fail-safe assembly [includes a light sensor associated with each position sensor associated with a seat of said one or more sensors in the machine, each of said light sensors] configured to provide sensor information from said fail-safe assembly about tampering [for compliance] with [said predetermined restrictions] *at least one of one or more sensors*;

a system controller configured enforce an allowable passenger restriction in order to operate the machine, said system controller receiving input signals from said one or more sensors regarding the presence of one or more passengers in predetermined locations in the machine, said system controller storing sensor information to a storage of the system concerning compliance with said predetermined restrictions[; and a display device integrated in the system controller and configured to display said sensor information to the system controller].

19. The system for compliance monitoring of claim 18, wherein said one or more sensors operably coupled to said system controller detecting the presence of one or more passengers are PIR sensors.

*20. The method of claim 10, further comprising the steps of:*

*sending a notification concerning compliance with said predetermined restrictions.*

*21. The system for compliance monitoring of claim 18, wherein said system controller configured to perform at least one of the following:*

*enforce an allowable passenger restriction in order to operate a machine; and*

*sending a notification concerning compliance with said predetermined restrictions.*

* * * * *